April 17, 1962   K. CECH   3,029,689
EXPOSURE METERING DEVICE
Filed March 23, 1959

INVENTOR.
KARL CECH
BY Otto John Munz
ATY.

3,029,689
EXPOSURE METERING DEVICE

Karl Cech, Modling, Lower Austria, Austria, assignor, by mesne assignments, to Alois Handler, Vienna, Austria, and Karl Vockenhuber, Vienna, Austria
Filed Mar. 23, 1959, Ser. No. 801,260
Claims priority, application Germany Apr. 16, 1958
5 Claims. (Cl. 88—23)

The present invention relates to an exposure metering device for cameras to provide a proper exposure of the film under lighting conditions with extreme lighting contrasts.

In use of exposure meters or automatic exposure controls though the devices generally work correctly often errors in exposure occur. This is caused by the fact that the result or measurement of the exposure metering device corresponds to the average lighting intensity of the scene or field image to be photographed. In case there are extreme lighting contrasts between the object to be photographed and its surroundings, the object to be photographed will not be exposed correctly. When, for example, persons are photographed on snow fields or on the beach, or against the light, often underexposure occurs. When shooting in artificial light, where the surroundings are not completely illuminated and when shooting out of windows or gates overexposure occurs.

This chance of errors may be eliminated by adjusting the respective corrected value of lens aperture or exposure time on the camera. This operation is relatively simple in those cameras wherein the light value is to be transferred by hand to the adjusting means on the camera; in cameras with coupled exposure meters it is difficult to consider the lighting contrasts. In automatic exposure— or diaphragm controls especially in changing lighting conditions a correction is completely rendered impossible. Correcting of the value of lens aperture or of the exposure time requires in every case a greater understanding of the conditions which especially less skilled photographers seldom have.

The purpose of the present invention is to provide a device which in simple manner renders a correction of the indication of the exposure metering device possible; thereby the unskilled amateur is able to make satisfactory pictures of scenes with extreme lighting contrasts.

According to the invention this problem is solved by provision of an exposure metering device comprising a photoelectric cell, a galvanometer, a viewfinder and masks insertable in the path of the light rays entering said viewfinder. The masks have a middle zone or area with a light transmittance deviating from the remaining part, and means coupled to said masks influencing the deflection of the galvanometer in such a manner that when a mask with a more absorbing middle or central zone as compared to the surrounding region surroundings is inserted the result of the measurement is increased and when a mask with a less absorbing middle or central zone as compared to the surrounding region surroundings is inserted the result of the measurement is decreased.

The operator has only to try by insertion of the respective masks to diminish the lighting differences between the central portion of the picture in the viewfinder image field and its surroundings, whereby the indication of the exposure metering device is automatically corrected.

Profitably the means influencing the exposure meter increases or decreases its indication approximately in one $f$-stop($=3/10°$ DIN) when inserting a mask, whereby preferably the ratio of light transmittance of the middle zone to the light transmittance of the marginal zone is 2:1 and 1:2, respectively.

It has been stated that a size of the middle zone of one third of the total area of the mask will be most profitable for most of the exposures.

In cameras having a frame size with a picture ratio of the usual value of 4:3 (for instance in wide screen shots) it is profitable to make the middle zone of elliptic or rhomboidal form in lieu of circular form, whereby also the ratio of the surfaces can deviate from the stated value.

According to another feature of the invention the masks are mechanically coupled to a shield in front of the photoelectric cell.

According to another embodiment of the invention the masks are coupled to electrical switches which switch on or switch out resistors provided in the circuit of the photoelectric cell.

According to another embodiment of the present invention the exposure metering device is built in a camera, whereby the diaphragm of the camera lens is controlled by a galvanometer.

The inventtion is diagrammatically illustrated in the accompanying drawing with reference to the embodiments shown by example.

Figure 1:
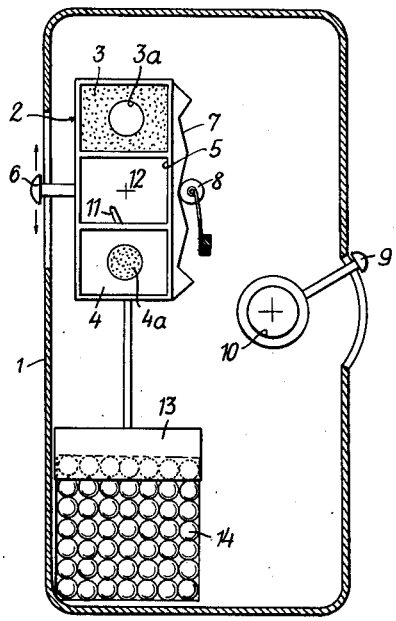
FIGURE 1 is a cross-section of a film camera provided with the invention and where all those parts are omitted that are not considered relevant to comprehend the object of invention.

According to FIGURE 1 in side of the casing 1 of a film camera, for example, a miniature camera a slide bar 2 is provided having two different masks. A mask 3 has a pellucid middle zone 3a, the remaining part of the mask is provided with a grey coating. Contrary thereto the middle zone 4a of a mask 4 is provided with a grey coating and the marginal zone is pellucid. Between the masks 3 and 4 a window 5 is arranged, eventually provided with clear-glass. In the position shown the window 5 is in the path of the rays from the view finder of the camera. The slide bar 2 is vertically slidable by means of a handle or knob 6 so that the masks 3 and 4 may be inserted into the path of the rays entering the view finder. In order to prevent the slide bar 2 from resting in an intermediate position a spring or click stop device is provided which is formed by a curved track 7 and a spring-biased roll 8. A shield 13 is coupled to the slide bar 2 and covers the photoelectric cell to a variable extent corresponding to the position of the slide bar 2. In comparison to the photoelectric cells hitherto known the photoelectric cell 14 is larger and more powerful because when shooting in normal lighting conditions according to the position shown in FIGURE 1 the photoelectric cell is partly covered. Shielding of the photoelectric cell has the advantage that the characteristic of the exposure metering device is not altered, but may not be realized in any case with respect to constructral reasons. The camera shown has a coupled exposure meter in which by turning the diaphragm adjusting lever 9 of the camera lens 10 by intermediary of suitable coupling means the pointer 11 of the exposure meter visible in the viewfinder is adjustable and brought into registry with a cross-wire 12 or the like. The coupling between objective diaphragm and exposure meter may be attained by insertion of resistors in the circuit of the photoelectric cell or by adjusting a shield in front of the photoelectric cell.

When shooting in extreme lighting conditions, for instance against the light, the mask 3 is inserted into the ray tracing of the light rays entering the viewfinder by adjustment of the slide bar 2, thus causing the surroundings of the object to be protographed to be masked off by the grey coating of the mask and the lighting contrasts become diminished. Contrary, when shooting, for instance out of windows or gates the mask 4 is inserted in the ray path of the viewfinder. The operator has therefore in extreme lighting contrasts only to try by adjustment of the slide bar 2 to equalize the lighting contrasts of the field of view, whereby the indication of the exposure meter is automatically corrected.

Figure 2:
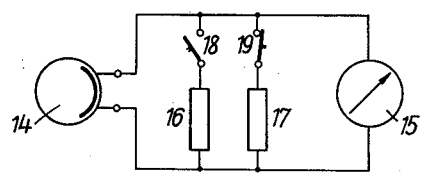
FIGURE 2 shows a simplified circuit diagram of another embodiment of the present invention.

FIGURE 2 shows another embodiment of the present invention having various advantages with respect to its assembly into the camera. In the circuit shown a photoelectric cell 14 is provided connected to a measuring system 15. Parallel resistors 16 and 17 are connected in the circuit of the photoelectric cell 14 by switches 18 and 19 coupled to the masks 3 and 4. In the position shown only the resistor 17 is in circuit which corresponds to a condition in which the clear-glass window 5 is inserted in the viewfinder (see FIGURE 1). When the mask 3 is inserted in the viewfinder the switch 18 is closed, when, however, the mask 4 is inserted into the path of the ray entering the viewfinder both switches 18, 19 are opened so that the resistors are inactive. Also a combination of the embodiments according to FIGURES 1 and 2 is possible.

The illustrated embodiments may be altered in various manners. So, for example, the masks 3, 4 can be arranged on a pivoted carrier. It is also possible to form the masks as parts of a flexible strap which runs over rolls and is wound up eventually. The masks may be produced by the respective exposure of light sensitive plates or films. Also glasses in trade under the trademarks "Umbral" or "Neophan" may be used.

The invention is particularly suitable for coupled exposure meters and automatic exposure and diaphragm controls, but not restricted thereto.

It is not rendered necessary to build the exposure meter in the camera. For example, the exposure meter may be connected to a separate motive-finder.

What I claim is:

1. In a camera having a viewfinder for viewing objects to be photographed, a photoelectric cell disposed to receive light from said objects to be photographed, an exposure metering device comprising a galvanometer for indicating light values connected to respond to photocurrent from said cell, a plurality of light contrast masks insertable alternatively in the path of the light rays entering said viewfinder for indicating to a viewer therethrough compensations to be made to said metering device, each of said masks having an area with light transmittance different than a region surrounding said area of the respective masks, a first of said masks having a region of high light transmittance surrounding an area of lesser light transmittance, a second of said masks having an area of low light transmittance and a region surrounding the last-mentioned area having greater light transmittance than said area of low light transmittance, each of said masks being positionable in an operative position with said areas individually in registry with a central portion of the image field of said viewfinder and said regions surrounding said areas in registry with the remaining portions of the image field of said viewfinder, and means for influencing the light value indications of said galvanometer comprising means coupled to said masks for causing said galvanometer to indicate a greater light value indication when said area of low transmittance is disposed in said operative position than normally indicated in response to the light conditions in the absence of said masks and for causing said galvanometer to indicate a lesser light value indication when said area of high transmittance is disposed in said operative position than normally indicated in response to the light conditions in the absence of said masks thereby to correct the light measurements of said exposure metering device according to the light conditions of the central part of a scene of which an exposure is to be taken in accordance with the indication of light contrast between the central portion of the image field of the viewfinder and other portions thereof in dependence upon which of said masks is employed to carry out said indication.

2. In a camera having a viewfinder for viewing objects to be photographed, a photoelectric cell disposed to receive light from said objects to be photographed, an exposure metering device comprising a galvanometer for indicating light values connected to respond to photocurrent from said cell, a plurality of light contrast masks insertable alternatively in the path of the light rays entering said viewfinder for indicating to a viewer therethrough compensations to be made to said metering device, each of said masks having an area with light transmittance different than a region surrounding said area of the respective masks, a first of said masks having a region of high light transmittance surrounding an area of lesser light transmittance, a second of said masks having an area of low light transmittance and a region surrounding the last-mentioned area having greater light transmittance than said area of low light transmittance, each of said masks being positionable in an operative position with said areas individually in registry with a central portion of the image field of said viewfinder and said regions surrounding said areas in registry with the remaining portions of the image field of said viewfinder, and means for influencing the light value indications of said galvanometer comprising means coupled to said masks for causing said galvanometer to indicate a greater light value indication and increase the light measurement approximately one-$f$-stop (3/10° DIN) when said area of low transmittance is disposed in said operative position than normally indicated in response to the light conditions in the absence of said masks and for causing said galvanometer to indicate a lesser light value indication and decrease the light measurement approximately in one-$f$-stop (3/10° DIN) when said area of high transmittance is disposed in said operative position than normally indicated in response to the light conditions in the absence of said masks thereby to correct the light measurements of said exposure metering device according to the light conditions of the central part of a scene of which an exposure is to be taken in accordance with the indication of light contrast between the central portion of the image field of the viewfinder and other portions thereof in dependence upon which of said masks is employed to carry out said indication.

3. In a camera having a viewfinder for viewing objects to be photographed, a photoelectric cell disposed to receive light from said objects to be photographed, an exposure metering device comprising a galvanometer for indicating light values connected to respond to photocurrent from said cell, a plurality of light contrast masks insertable alternatively in the path of the light rays entering said viewfinder for indicating to a viewer therethrough compensations to be made to said metering device, each of said masks having an area with light transmittance different than a region surrounding said area of the respective masks, a first of said masks having a region of high light transmittance surrounding an area of lesser light transmittance, a second of said masks having an area of low light transmittance and a region surrounding the last-mentioned area having greater light transmittance than said area of low light transmittance, each of said masks being positionable in an operative position with said areas individually in registry with a central portion of the image field of said viewfinder and said regions surrounding said areas in registry with the remaining portions of the image field of said viewfinder, the light transmittance ratio of said areas and said regions being 2:1 and 1:2 in the first and second masks respectively and means for influencing the light value indications of said galvanometer comprising means coupled to said masks for causing said galvanometer to indicate a greater light value indication when said area of low transmittance is disposed in said operative position than normally indicated in response to the light conditions in the absence of said masks and for causing said galvanometer to indicate a lesser light value indication when said area of high transmittance is disposed in said operative position than normally indicated in response to the light conditions in the absence of said masks thereby to correct the light measurements of said exposure metering device according to the light conditions of the central part of a scene in which an exposure is to be taken in accordance with the indication of light contrast between the central portion of the image field of the viewfinder and other portions thereof in dependence upon which of said masks is employed to carry out said indication.

4. In a camera having a viewfinder for viewing objects to be photographed, a photoelectric cell disposed to receive light from said objects to be photographed, an exposure metering device comprising a galvanometer for indicating light values connected to respond to photocurrent from said cell, a plurality of light contrast masks insertable alternatively in the path of the light rays entering said viewfinder for indicating to a viewer therethrough compensations to be made to said metering device, each of said masks having an area with light transmittance different than a region surrounding said area of the respective masks, a first of said masks having a region of high light transmittance surrounding an area of lesser light transmittance, a second of said masks having an area of low light transmittance and a region surrounding the last-mentioned area having greater light transmittance than said area of low light transmittance, each of said masks being positionable in an operative position with said areas individually in registry with a central portion of the image field of said viewfinder and said regions surrounding said areas in registry with the remaining portions of the image field of said viewfinder, and means for influencing the light value indications of said galvanometer comprising shield means coupled to said masks disposed to variably cut-off light impinging on said cell and operable to positions for causing said galvanometer to indicate a greater light value indication when said area of low transmittance is disposed in said operative position than normally indicated in response to the light conditions in the absence of said masks and for causing said galvanometer to indicate a lesser light value indication when said area of high transmittance is disposed in said operative position than normally indicated in response to the light conditions in the absence of said masks thereby to correct the light measurements of said exposure metering device according to the light conditions of the central part of a scene in which an exposure is to be taken in accordance with the indication of light contrast between the central portion of the image field of the viewfinder and other portions thereof in dependence upon which of said masks is employed to carry out said indication.

5. In a camera having a viewfinder for viewing of objects to be photographed, a photoelectric cell disposed to receive light from said objects to be photographed, an exposure metering device comprising a galvanometer for indicating light values connected to respond to photocurrent from said cell, a plurality of light contrast masks insertable alternatively in the path of the light rays entering said viewfinder for indicating to a viewer therethrough compensations to be made to said metering device, each of said masks having an area with light transmittance different than a region surrounding said area of the respective masks, a first of said masks having a region of high light transmittance surrounding an area of lesser light transmittance, a second of said masks having an area of low light transmittance and a region surrounding the last-mentioned area having greater light transmittance than said area of low light transmittance, each of said masks being positionable in an operative position with said areas individually in registry with a central portion of the image field of said viewfinder and said regions surrounding said areas in registry with the remaining portions of the image field of said viewfinder, and resistors connected to said cell and said galvanometer for influencing the indications of said galvanometer comprising switch means coupled to said masks for placing said resistors in circuit and out of circuit for causing said galvanometer to indicate a greater light value indication when said area of low transmittance is disposed in said operative position than normally indicated in response to the light conditions in the absence of said masks and for causing said galvanometer to indicate a lesser light value indication when said area of high transmittance is disposed in said operative position than normally indicated in response to the light conditions in the absence of said masks thereby to correct the light measurements of said exposure metering device according to the light conditions of the central part of a scene of which an exposure is to be taken in accordance with the indication of light contrast between the central portion of the image field of the viewfinder and other portions thereof in dependence upon which of said masks is employed to carry out said indication.

References Cited in the file of this patent
UNITED STATES PATENTS

| | | |
|---|---|---|
| 1,870,464 | Ramsey | Aug. 9, 1932 |
| 2,142,657 | Sauer et al. | Jan. 3, 1939 |
| 2,243,383 | Leber | May 27, 1941 |
| 2,247,805 | Faus | July 1, 1941 |
| 2,667,809 | Williams | Feb. 2, 1954 |
| 2,841,064 | Bagby et al. | July 1, 1958 |